United States Patent
Leturcq et al.

(10) Patent No.: US 10,839,968 B2
(45) Date of Patent: Nov. 17, 2020

(54) METHOD FOR DISSOLVING NUCLEAR FUEL

(71) Applicants: Orano Cycle, Courbevoie (FR); COMMISSARIAT À L'ÉNERGIE ATOMIQUE ET AUX ÉNERGIES ALTERNATIVES, Paris (FR)

(72) Inventors: Gilles Leturcq, Camaret sur Aigues (FR); Thibaud Delahaye, Tresques (FR)

(73) Assignees: ORANO CYCLE, Courbevoie (FR); COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/310,471

(22) PCT Filed: Jun. 21, 2017

(86) PCT No.: PCT/FR2017/051646
§ 371 (c)(1),
(2) Date: Dec. 17, 2018

(87) PCT Pub. No.: WO2017/220928
PCT Pub. Date: Dec. 28, 2017

(65) Prior Publication Data
US 2019/0189298 A1 Jun. 20, 2019

(30) Foreign Application Priority Data
Jun. 23, 2016 (FR) ...................................... 16 55871

(51) Int. Cl.
*G21C 19/46* (2006.01)

(52) U.S. Cl.
CPC ........... *G21C 19/46* (2013.01); *Y02W 30/883* (2015.05)

(58) Field of Classification Search
CPC ...................................................... G21C 19/46
See application file for complete search history.

(56) References Cited

U.S. PATENT DOCUMENTS

| 3,813,464 A | 5/1974 | Ayers | |
| 4,247,495 A * | 1/1981 | Ennerst | G21C 3/623 264/0.5 |

(Continued)

FOREIGN PATENT DOCUMENTS

| DE | 1542175 A1 | 6/1970 | |
| EP | 0036214 A2 * | 9/1981 | ............. G21C 3/623 |

(Continued)

OTHER PUBLICATIONS

International Search Report for International Application No. PCT/FR2017/051646, dated Sep. 28, 2017.

(Continued)

*Primary Examiner* — Melissa S Swain
(74) *Attorney, Agent, or Firm* — Pearne & Gordon LLP

(57) ABSTRACT

A process for dissolving nuclear fuel, in particular irradiated nuclear fuel, comprising immersion of the nuclear fuel in a nitric acid solution. This dissolution process further comprises mechanical milling of the nuclear fuel, this mechanical milling being performed in the nitric acid solution during the immersion. The disclosure also relates to the use of a mill equipped with mechanical milling structure to implement the dissolution process.

18 Claims, 1 Drawing Sheet

(56) References Cited

U.S. PATENT DOCUMENTS

| | | | | | |
|---|---|---|---|---|---|
| 4,439,402 | A | * | 3/1984 | Tarutani | C01G 43/025 422/159 |
| 4,514,364 | A | * | 4/1985 | Stoll | G21C 19/34 423/4 |
| 4,676,935 | A | * | 6/1987 | Funke | G21C 3/623 252/643 |
| 9,428,401 | B1 | * | 8/2016 | Christian | G21C 3/62 |
| 2018/0218798 | A1 | * | 8/2018 | Miguirditchian | C22B 60/026 |

FOREIGN PATENT DOCUMENTS

| | | |
|---|---|---|
| EP | 2345041 A1 | 7/2011 |
| WO | 01/33575 A2 | 5/2001 |

OTHER PUBLICATIONS

Written Opinion for International Application No. PCT/FR2017/051646, dated Sep. 28, 2017.

Preliminary French Search Report for Application No. 1655871, dated May 23, 2017.

\* cited by examiner

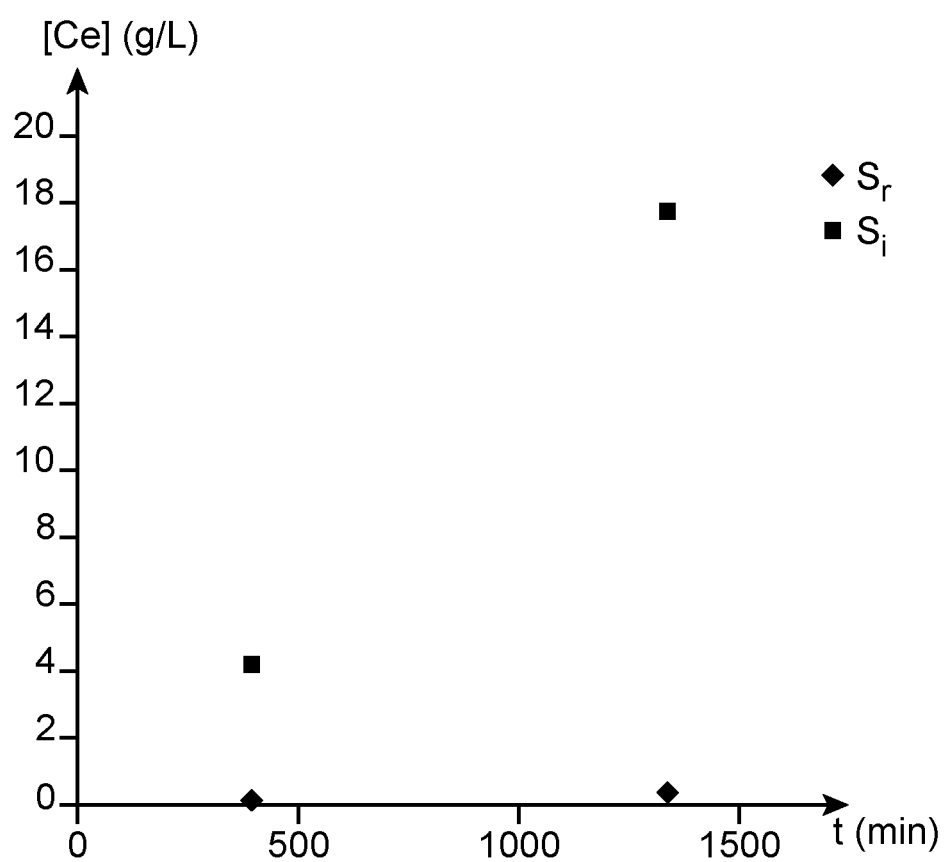

METHOD FOR DISSOLVING NUCLEAR FUEL

CROSS-REFERENCE TO RELATED APPLICATIONS

This is a National Stage application of PCT international application PCT/FR2017/051646, filed on Jun. 21, 2017, which claims the priority of French Patent Application No. 16 55871, filed Jun. 23, 2016, both of which are incorporated herein by reference in their entirety.

TECHNICAL FIELD

The present invention relates to a process for dissolving nuclear fuel, this process having improved performance compared with current dissolution processes, in particular when the nuclear fuel, whether irradiated in a nuclear reactor or a fabrication reject, comprises plutonium or a mixture of uranium and plutonium.

The present invention also relates to the use of a particular device to implement this dissolution process.

Finally, the invention relates to a process for dissolving irradiated nuclear fuel which implements the preceding dissolution process, to obtain improved dissolution of valuable compounds contained in the dissolution fines from current dissolution processes.

STATE OF THE PRIOR ART

With the constant search to optimize management of radioactive waste, the fuel unloaded from nuclear reactors, called "irradiated fuel" or "spent fuel", is treated for the purpose of separating recyclable material such as uranium and plutonium from ultimate waste currently considered to be non-recyclable, i.e. fission products such as platinoids and minor actinides, e.g. neptunium, americium and curium.

Treatment entails a set of physical and chemical processes: the assemblies of irradiated nuclear fuel, composed of sealed claddings inside which the material forming the nuclear fuel is confined, are typically cut into segments having a length of about 3 cm to 5 cm. These segments are then immersed in a concentrated nitric acid solution to dissolve the nuclear material confined within the claddings, these claddings being practically insoluble.

The nitric dissolution solution obtained after this immersion contains, in the liquid phase, uranium, plutonium, minor actinides, soluble fission products and insoluble solid products among which the insoluble fission products routinely called "dissolution fines". These dissolution fines correspond to solids of small particle size, typically less than 1 μm, resulting from the non-dissolving, with current dissolution processes, of some fission products such as platinoids and/or from partial dissolution of some others such as molybdenum, zirconium or technetium.

This nitric dissolution solution is then subjected to a succession of chemical steps to separate the valuable and/or recyclable materials and to produce solutions of plutonium and uranium from which the uranium and plutonium are recycled to produce fresh fuel.

The process of dissolving nuclear fuel in a nitric acid solution amounts to a key step in treatment since it must allow the fullest possible passing into solution of the chemical elements contained in this nuclear fuel.

To date, this nuclear fuel dissolution process is a process able to be carried out in batch or continuous operation.

With continuous operation, the dissolution process is implemented by means of a rotating dissolver comprising a bucket wheel rotating in a tank containing the nitric acid solution heated to between 90° C. and 105° C. The buckets are loaded when the wheel is at a standstill via direct feeding of the segmented assemblies into a bucket. The wheel is then rotated to feed the next bucket. The rotating speed of the wheel is chosen so as to guarantee a residence time of the immersed segmented assemblies that is longer than two hours, to optimize dissolution of the irradiated fuel in the nitric acid solution.

The performance level of this current dissolution process varies as a function of the constituent material of the nuclear fuel that it is sought to dissolve.

While the current process using said rotating dissolver is fully satisfactory for the dissolution of uranium-based nuclear fuel, in particular containing uranium oxides known as "UOX fuels", it is observed that this is not necessarily the case for all uranium and plutonium nuclear fuels, in particular for fuels containing mixed oxides of uranium and plutonium called "MOX fuels".

Some of these MOX fuels, whether or not irradiated, can contain greater or lesser amounts of chemical heterogeneities in the form of islands and characterized by a higher plutonium content than in the remainder of the fuel. In particular, when the plutonium content in an island reaches about 35% of the total uranium and plutonium content, the fraction of insoluble plutonium in the nitric acid starts to increase and reaches 100% when the plutonium content, relative to the total uranium and plutonium content, is in the region of 60% and 70% in 5 M and 10 M nitric acid respectively.

In an attempt to overcome this dissolution issue encountered with MOX fuels having high local contents of plutonium, it has been proposed to place under agitation the mixture formed by the segments of nuclear fuel and the nitric acid solution. However, it is difficult to envisage the implementing of mechanical agitation within a rotating dissolver.

Therefore, and if the dissolution process is carried out in a rotating dissolver, it has been proposed to continuously renew the nitric acid solution, the buckets being pierced to allow the circulation of this solution. However, said proposition is not without impact on the volumes of nitric acid solution to be employed.

Also, in current dissolution processes, the dissolution fines contained in the nitric dissolution solution can be subjected to a solid/liquid separation operation, e.g. via centrifugation, and then treated by integration into the flow of material to be vitrified in the vitrification process.

Yet, since these dissolution fines are associated with, or integrate within their particles, compounds that are recoverable such as plutonium, uranium and/or soluble fission products, it is desirable to find means to recover these valuable compounds by optimizing the dissolution thereof in the nitric acid solution so that they can be recycled for the fabrication of fresh fuel. In the remainder of the present description, these recoverable compounds associated with the dissolution fines or integrated in the particles of these dissolution fines are designated as being "contained" in these dissolution fines.

It is therefore the objective of the invention to overcome these different shortcomings just mentioned of the dissolution processes currently used to treat nuclear fuel, whether or not irradiated, and therefore to propose a process allowing improved dissolution of this fuel, in particular improved dissolution of MOX fuels having high local contents of plutonium.

It is also an objective of the invention to provide a process for dissolving irradiated nuclear fuel allowing optimized dissolution of the recoverable compounds contained in the dissolution fines resulting from current dissolution processes, with a view to recycling said compounds.

It is a further objective of the invention to provide a dissolution process able to be implemented in batch or continuous operation and allowing improved dissolution of any type of irradiated nuclear fuel that is to be treated, using reasonable volumes of nitric acid solution and under optimum safety conditions.

In particular, it must be possible for this dissolution process to be implemented independently of the composition of the irradiated nuclear fuel, whether it is irradiated fuel which originally was fresh fuel of UOX type or MOX type, and irrespective of the plutonium content in any islands which may be contained in this MOX fuel compared with the total uranium and plutonium content.

In addition, the fabrication of fresh plutonium-containing nuclear fuel can lead to the generation of fabrication rejects. Said fabrication rejects can be formed in particular by plutonium mixed oxide powders possibly containing americium, by uranium and plutonium mixed oxide powders $(U,Pu)O_2$ and/or by pellets of mixed fuel of MOX type, these powders and/or pellets being considered non-conforming to specifications and may also be confined in sheaths called "rods". It is known that these non-irradiated materials exhibit more refractory behaviour on dissolution by nitric acid than these same materials when present in irradiated fuel.

More generally, this process must therefore also allow the dissolution of these fabrication rejects and materials included in the composition of fresh (non-irradiated) fuel, such as plutonium oxide powders or uranium and plutonium mixed oxide powders, pellets of MOX fuel or rods of fresh MOX fuel, with a view to recycling the recyclable materials contained in these various fabrication rejects.

DISCLOSURE OF THE INVENTION

These objectives and others are reached first with a process for dissolving nuclear fuel, whether irradiated or fresh, comprising the immersing of the nuclear fuel in a nitric acid solution.

According to the invention, this dissolution process also comprises mechanical milling of the nuclear fuel, this mechanical milling being performed in the nitric acid solution during said immersion.

The process of the invention therefore entails concomitant implementing of immersion and mechanical milling of the nuclear fuel, to optimize the dissolution of the constituent materials of this fuel in a nitric acid solution and thereby to obtain a nitric dissolution solution having a liquid phase which not only comprises the compounds that are at least partly dissolved with current dissolution processes, and in particular plutonium and optionally uranium, minor actinides and soluble fission products, but also the recoverable compounds contained in the dissolution fines which current dissolution processes are unable to solubilize such as plutonium, uranium and/or soluble fission products.

The application of said mechanical milling during immersion of the nuclear fuel allows a gradual decrease in the size of the particles, or grains, of the nuclear fuel to be dissolved, and hence a gradual increase in specific surface area. By doing so, the mechanical milling associated with immersion allows an increase, on the surface of the nuclear fuel particles, in the number of reaction sites at which the dissolution reaction takes place, but also in the number of structural and/or crystallographic defects which correspond to potential corrosion sites and hence potential dissolution sites of said nuclear fuel particles in the nitric acid solution.

All the above-described phenomena allow the consideration that the dissolution process of the invention is a process which allows the obtaining of continuous activation of the surface of the nuclear fuel particles, promoting dissolution thereof in the nitric acid solution.

The performing of mechanical milling during immersion of the nuclear fuel also ensures renewal via agitation of the nitric acid solution at the solid/liquid interface (nuclear fuel particles/nitric acid solution), without the need to have recourse to excessive volumes of nitric acid solution and/or to an additional agitation system as such. The implementation of the dissolution process of the invention can therefore be fully envisaged for batch or continuous operation.

This finding is all the more unexpected and surprising as the performance levels of dissolution reached with the process of the invention are much higher than those which would be obtained with a nuclear fuel dissolution process providing for milling prior to immersion and wherein the specific surface area of the nuclear fuel would undeniably be higher, and that right at the start of immersion.

In addition, by performing mechanical milling in the nitric acid solution, the process of the invention has the other major advantage of limiting dissemination of the ground particles of nuclear fuel and therefore any resulting contamination, compared with a dissolution process in which this mechanical milling is "dry" milling prior to immersion of the fuel in the nitric acid solution, having regard to the nuclear nature of the fuel to be dissolved.

In one advantageous variant of the process of the invention, the nitric acid solution in which the nuclear fuel is simultaneously immersed and milled is heated to between 90° C. and 105° C.

The fact that the nitric acid solution is heated allows an increase in the dissolution kinetics of the nuclear fuel and, therefore, a further improvement in the dissolution performance of the process of the invention.

In one variant of the process of the invention, the molar concentration of the nitric acid solution can be between 1 mol/L and 10 mol/L.

The molar concentration of the nitric acid solution can be adapted in particular to the composition of the material forming the nuclear fuel to be dissolved.

The molar concentration of the nitric acid solution is advantageously between 3 mol/L and 8 mol/L.

In another advantageous variant of the process of the invention, the nitric acid solution may also comprise a neutron poison.

The presence of a neutron poison in the mixture formed by the nuclear fuel and nitric acid solution allows optimization of the condition of a neutron state of this mixture, called sub-critical.

As an example of neutron poison, mention can be made of gadolinium.

In another variant of the process of the invention, the immersing of the nuclear fuel in the nitric acid solution can be maintained for a time of at least 30 min.

The immersion time of the nuclear fuel in the nitric acid solution can be adapted in particular to the composition of this nuclear fuel to be dissolved.

With the process of the invention, in-line monitoring of dissolution can be ensured, allowing piloted halting of dissolution, and hence draining of the dissolution reactor, as a function of the state of progress of the dissolution reactions under consideration.

As indicated above, unlike prior art dissolution processes, the process of the invention comprises mechanical milling of the nuclear fuel that is carried out in the nitric acid solution during the immersion of said nuclear fuel.

Evidently, this mechanical milling can be carried out during part of the immersion time of the nuclear fuel.

However, in one particularly preferred variant of the process of the invention, mechanical milling is carried out during the entire immersion time so as to further optimize dissolution of the nuclear fuel in the nitric acid solution.

If the nuclear fuel is confined within a cladding, the dissolution process of the invention can advantageously further comprise a step to de-clad the nuclear fuel, this decladding step being performed prior to immersion.

Said decladding step promotes contact between the nitric acid solution and the consituent material of the nuclear fuel, whether this material is in powder or in pellet form.

This decladding step is conventionally ensured by mechanical decladding.

Said mechanical decladding step can be performed for example by shearing or with the technical means proposed in document EP 2 345 041 allowing these claddings to be emptied by "ovalisation".

Evidently, if the constituent material of the nuclear fuel is a non-irradiated plutonium oxide powder, possibly also containing uranium or americium, or a non-irradiated pellet (rejected on fabrication) containing plutonium oxide or a mixed uranium and plutonium oxide, the dissolution process of the invention does not require said prior decladding step, the non-irradiated powders and pellets being able to be milled directly.

The nuclear fuel to be dissolved, whether irradiated or non-irradiated, may comprise at least one plutonium oxide and/or at least one mixed oxide of plutonium and of at least one second metal other than plutonium. As will be seen below, this second metal can particularly be selected from among uranium, thorium, neptunium, americium and curium.

When the nuclear fuel to be dissolved is an irradiated fuel, this fuel can evidently come from fresh fuel comprising at least one uranium oxide such as an uranium dioxide $UO_2$ fuel, also called UOX fuel. If it comprises at least one mixed oxide of plutonium and of at least one second metal, this nuclear fuel, whether or not irradiated, can be a fuel of a mixed oxide of plutonium and of at least one element selected from among uranium, thorium and a minor actinide.

By "minor actinide" is meant a chemical element in the actinide family with the exception of uranium, plutonium and thorium. Said minor actinides are formed in the reactors by successive capturing of neutrons by the uranium nuclei of the nuclear fuel. The chief minor actinides are neptunium, americium and curium.

The nuclear fuel comprising at least one mixed oxide of plutonium and of at least one second metal can particularly be a mixed oxide fuel of uranium and plutonium $(U,Pu)O_2$, also called MOX fuel.

With its improved dissolution properties compared with current dissolution processes, the process of the invention particularly allows the dissolution of MOX fuels having local chemical heterogeneities with high plutonium content, typically 35% or more of the total uranium and plutonium content.

The fuel comprising at least one mixed oxide of plutonium and of at least one second metal may also be a mixed oxide fuel of plutonium and of one or more minor actinides, this or these minor actinides more particularly being selected from among neptunium, americium and curium.

Although the process of the invention focuses essentially on the dissolution of nuclear fuel formed of an irradiated nuclear fuel, it can also advantageously be applied to the dissolution of fresh, non-irradiated nuclear fuel for which dissolution in a nitric acid solution is known to be more difficult than for the same fuel when irradiated.

In particular, this nuclear fuel may comprise and even consist of fabrication rejects of non-irradiated or fresh nuclear fuel.

Therefore, the nuclear fuel that can be dissolved with the process of the invention can be irradiated fuel and/or non-irradiated fuel.

The invention secondly relates to the use of a particular device to implement the process for dissolving a nuclear fuel such as defined above, the advantageous characteristics of the dissolution process possibly being taken alone or in combination.

According to the invention, this device is a mill equipped with mechanical milling means.

As is fully conventional, said mill is equipped with a milling chamber equipped with mechanical milling means and fed with the nuclear fuel, nitric acid solution and optional neutron poison.

The advantage of the use of said mill particularly lies in the fact that it can be easily and safely connected with means for feeding the nuclear fuel and nitric acid solution for loading thereof into the milling chamber, with means for evacuating the nitric dissolution solution, solid insoluble products and gases, and with one or more of the following means:

means for filtering the nitric dissolution solution;
heating means;
means for recirculating the nitric dissolution solution;
sampling means; and
means for adjusting dissolution reaction parameters such as temperature and pH.

As examples, the heating means can be adapted for direct heating of the mixture formed by the nuclear fuel and nitric acid solution, or they can be associated with means for circulating said mixture such as an expansion tank.

Similarly, adjustment of pH can be obtained by adding a suitable solution either directly to the milling chamber or via an expansion tank in which there circulates the mixture formed by the nuclear fuel and nitric acid solution.

The connecting of the mill to the sampling means can notably allow monitoring of the state of progress of dissolution. Said sampling means can be arranged, in series or in parallel, to measure the pH of the nitric dissolution solution and/or the concentration of ions in this solution (e.g. via colorimetry/UV/visible spectrometry, via assay) or to determine the particle size distribution of the nuclear fuel to be dissolved (e.g. granulometry). Said sampling means can be composed in particular of milli-fluid cells.

The mill used to implement the dissolution process of the invention is advantageously a bead or pebble mill. The mill materials and the beads or pebbles are evidently adapted to resist the nuclear nature of the fuel to be dissolved and any corrosion which could be generated by the nitric acid solution.

Therefore, and in one advantageous version of the invention, the bead(s) and other pebble(s) are in zirconium dioxide, also known as zirconia, which optimizes resistance to corrosion generated by the mixture formed by the nuclear fuel and nitric acid solution.

The invention thirdly relates to a process for dissolving irradiated nuclear fuel allowing improved dissolution of recoverable compounds contained in the dissolution fines from current dissolution processes.

According to the invention, this process comprises the following successive steps taken in this order:
(a) dissolving irradiated nuclear fuel by immersion in a nitric acid solution, after which a nitric dissolution solution containing dissolution fines is obtained;
(b) separating the dissolution fines from the nitric dissolution solution; and
(c) dissolving the dissolution fines separated at step (b) by implementing the previously described dissolution process, the advantageous characteristics of this process possibly being taken alone or in combination.

In other words, the process for dissolving irradiated nuclear fuel comprises the following successive steps taken in this order:
(a) dissolving irradiated nuclear fuel by immersion in a nitric acid solution, after which a nitric dissolution solution containing dissolution fines is obtained;
(b) separating the dissolution fines from the nitric dissolution solution; and
(c) dissolving the dissolution fines separated at step (b) by immersion and mechanical milling of these dissolution fines in a nitric acid solution, this mechanical milling being performed in the nitric acid solution during said immersion.

Steps (a) and (b) of the above process correspond to the steps of current dissolution processes, these steps having been described in the foregoing under the chapter titled "State of the prior art". As indicated in this chapter, the implementation of these steps (a) then (b) do not allow satisfactory dissolution of the recoverable compounds contained in dissolution fines, in particular plutonium, uranium and/or soluble fission products.

However, the performing of step (c) after step (b) allows optimization of this dissolution of the recoverable compounds contained in the dissolution fines from current dissolution processes, with a view to recycling thereof. The flow of solid materials that can be vitrified is thereby de facto depleted of plutonium, of uranium and/or of soluble fission products.

In one variant of the process of the invention, when the irradiated nuclear fuel is confined in a cladding, a step to de-clad the irradiated nuclear fuel can be carried out, this decladding step preceding step (a).

The irradiated nuclear fuel to be dissolved may comprise at least one plutonium oxide and/or at least one mixed oxide of plutonium and at least one second metal other than plutonium. This second metal can more particularly be selected from among uranium, thorium, neptunium, americium and curium.

The irradiated nuclear fuel containing at least one mixed oxide of plutonium and of at least one second metal can more particularly be a MOX fuel.

Other characteristics and advantages of the invention will become apparent on reading the remainder of the description referring to appended FIG. 1 and relating to examples of embodiment of dissolution processes, two processes conforming to the invention comprising simultaneous immersion and milling ($P_i$ and $P_I$) and two other reference processes, one only comprising immersion ($P_r$) and the other comprising milling followed by immersion ($P_R$).

It is specified that examples described below were conducted with cerium dioxide $CeO_2$, sometimes called ceria, which is a non-radioactive metal oxide simulating plutonium in terms of dissolution in a nitric acid solution.

These examples are evidently given to illustrate the subject of the invention and under no circumstances limit this subject-matter.

BRIEF DESCRIPTION OF THE DRAWINGS

FIG. 1 gives a graph translating the change, as a function of time (denoted t and expressed in min), in the weight concentration of cerium (denoted [Ce] and expressed in g/L), in nitric dissolution solutions obtained when implementing two dissolution processes, one conforming to the invention ($P_i$), the other being a reference process conforming to the state of the art ($P_r$).

DETAILED DESCRIPTION OF PARTICULAR EMBODIMENTS

Example 1

Comparison Between Two Ceria Dissolution Processes in (5M) Nitric Acid Solution

In this example, a bead mill available from Wma-Getzmann under the trade name Dispermat® SL5 having a 50 mL milling chamber volume and zirconium dioxide beads were used.

A three-way valve was connected to the outlet pipe of this mill for sampling purposes to determine the state of progress of ceria dissolution in the nitric acid solution by monitoring the concentration of cerium [Ce] in the resulting nitric dissolution solution, this concentration being determined by Inductively Coupled Plasma, Atomic Emission Spectrometry (ICP-AES).

For the first test, 20 g of ceria were immersed in 100 mL of nitric acid solution at a molar concentration of 5 mol/L (5 M) in the milling chamber of the bead mill, in the presence of the beads, so as to monitor the progress of ceria dissolution when implementing a reference dissolution process denoted $P_i$.

For a second test, 20 g of ceria were immersed in 100 mL of nitric acid solution at a molar concentration of 5 mol/L (or 5 M) in the milling chamber of the bead mill, but in the absence of said beads, so as to monitor the progress of ceria dissolution when implementing a reference dissolution process denoted $P_r$.

With reference to FIG. 1 giving the change, as a function of time, in the weight concentration of cerium in each of the nitric dissolution solutions obtained when implementing the dissolution processes $P_i$ and $P_r$, it is observed that:
after 400 min (i.e. a little more than 6 h), the weight concentration of cerium in the nitric dissolution solution is 0.09 g/L for process $P_r$ against 4.22 g/L for process $P_i$, which corresponds to 0.1% dissolution of ceria with process $P_r$ against 5% with process $P_i$; and
after 1350 min (about 22 h), the weight concentration of cerium in the nitric dissolution solution is 0.31 g/L for process $P_r$ against 17.75 g/L for process $P_i$, which corresponds to only 0.2% dissolution of ceria with process $P_r$ against 11% with process $P_i$.

In other words, it is observed an increase by a factor of 50 in the dissolution kinetics of ceria in 5 M nitric acid solution, justifying the advantage of simultaneously performing ceria immersion and milling.

Example 2

Comparison Between Two Ceria Dissolution Processes in (5 M) Nitric Acid Solution In this example, an oscillating mill was used comprising two compartments denoted $C_I$ and $C_R$.

In compartment $C_I$, comprising a grinding bead in zirconium dioxide, a dissolution process conforming to the invention was implemented, denoted $P_I$. 2 g of ceria were immersed in 10 mL of nitric acid solution at a molar concentration of 5 M. After an immersion time and simultaneous milling of 7.5 h of the ceria in the nitric acid solution, the nitric dissolution solution obtained denoted $S_I$ was analysed by ICP-AES.

In compartment $C_R$, comprising a grinding bead in zirconium dioxide, a reference dissolution process was implemented, denoted $P_R$. 2 g of ceria were immersed in 10 mL of deionized water. After an immersion time and simultaneous milling of 7.5 h of the ceria in the deionized water, the solution comprising the milled ceria was filtered and dried. The milled, dried ceria was then placed in a beaker and immersed in 10 mL of nitric acid solution at a molar concentration of 5 M, under agitation with a magnetic stir bar. After an immersion time of 7.5 h with agitation of the milled ceria in the nitric acid solution, the nitric dissolution solution obtained denoted $S_R$ was also analysed by ICP-AES.

The weight concentrations of cerium measured in solutions $S_I$ and $S_R$ respectively were 4 g/L and 0.75 g/L.

An increase is therefore observed in this example by a factor of 5 in the dissolution kinetics of ceria in the 5 M nitric acid solution.

Such results clearly evidence the synergy of the dissolution process conforming to the invention which applies simultaneous immersion and milling, compared with a dissolution process applying milling followed by immersion.

BIBLIOGRAPHY

EP 2 345 041 A1

What is claimed is:

1. Process for dissolving nuclear fuel, comprising immersion of the nuclear fuel in a nitric acid solution, wherein it comprises mechanical milling of the nuclear fuel, this mechanical milling being performed in the nitric acid solution during said immersion.

2. The dissolution process according to claim 1, wherein the nitric acid solution is heated to between 90° C. and 105° C.

3. The dissolution process according to claim 1, wherein the molar concentration of the nitric acid solution is between 1 mol/L and 10 mol/L.

4. The dissolution process according to claim 1, wherein the nitric acid solution also comprises a neutron poison such as gadolinium.

5. The dissolution process according to claim 1, wherein mechanical milling is performed throughout the entire duration of immersion.

6. The dissolution process according to claim 1, wherein the nuclear fuel comprises at least one plutonium oxide and/or at least one mixed oxide of plutonium and of at least one second metal selected from among uranium, thorium, neptunium, americium and curium.

7. The dissolution process according to claim 6, wherein, the second metal being uranium, the nuclear fuel containing at least one mixed oxide of uranium and plutonium is a MOX fuel.

8. The dissolution process according to claim 1, wherein the nuclear fuel is irradiated nuclear fuel.

9. The dissolution process according to claim 1, wherein the nuclear fuel comprises fabrication rejects of non-irradiated nuclear fuel.

10. The dissolution process according to claim 1, further comprising, when the nuclear fuel is confined within a cladding, a step to de-clad the nuclear fuel, this decladding step being prior to immersion.

11. The dissolution process according to claim 1, further comprising the implementation of a mill equipped with mechanical milling means.

12. The dissolution process according to claim 11, wherein the mill is a bead or pebble mill.

13. The dissolution process according to claim 3, wherein the molar concentration of the nitric acid solution is between 3 mol/L and 8 mol/L.

14. The dissolution process according to claim 12, wherein the beads or pebbles are in zirconium dioxide.

15. Process for dissolving irradiated nuclear fuel comprising the following successive steps, taken in this order:
   (a) dissolving irradiated nuclear fuel by immersion in nitric acid solution, after which a nitric dissolution solution is obtained containing dissolution fines;
   (b) separating the dissolution fines from the nitric dissolution solution; and
   (c) dissolving the dissolution fines separated at step (b), wherein the dissolving step (c) comprises immersion of the dissolution fines in a nitric acid solution and mechanical milling of the dissolution fines, the mechanical milling being performed in the nitric acid solution during said immersion.

16. The process according to claim 15 further comprising, when the irradiated nuclear fuel is confined within a cladding, a step to de-clad the irradiated nuclear fuel, this decladding step preceding step (a).

17. The dissolution process according to claim 15, wherein the irradiated nuclear fuel comprises at least one plutonium oxide and/or at least one mixed oxide of plutonium and of at least one second metal selected from among uranium, thorium, neptunium, americium and curium.

18. The dissolution process according to claim 17, wherein, the second metal being uranium, the nuclear fuel comprising at least one mixed oxide of uranium and plutonium is MOX fuel.

* * * * *